United States Patent
Soso et al.

(10) Patent No.: US 11,745,634 B2
(45) Date of Patent: Sep. 5, 2023

(54) TRAILER WITH TILTING AXLE UNIT

(71) Applicants: Elena Soso, S. Stefano di Zimella (IT); Stefano Soso, S. Stefano di Zimella (IT)

(72) Inventors: Elena Soso, S. Stefano di Zimella (IT); Stefano Soso, S. Stefano di Zimella (IT)

(*) Notice: Subject to any disclaimer, the term of this patent is extended or adjusted under 35 U.S.C. 154(b) by 21 days.

(21) Appl. No.: 17/628,585

(22) PCT Filed: Jul. 15, 2020

(86) PCT No.: PCT/IT2020/050174
§ 371 (c)(1),
(2) Date: Jan. 20, 2022

(87) PCT Pub. No.: WO2021/014474
PCT Pub. Date: Jan. 28, 2021

(65) Prior Publication Data
US 2022/0250525 A1     Aug. 11, 2022

(30) Foreign Application Priority Data
Jul. 24, 2019   (IT) ..................... 102019000012795

(51) Int. Cl.
*B60P 1/02*   (2006.01)
*B60P 1/34*   (2006.01)
*B60P 3/06*   (2006.01)

(52) U.S. Cl.
CPC .............. *B60P 1/027* (2013.01); *B60P 1/34* (2013.01); *B60P 3/06* (2013.01)

(58) Field of Classification Search
CPC .............. B60P 1/34; B60P 1/027; B60P 3/06
See application file for complete search history.

(56) References Cited

U.S. PATENT DOCUMENTS

| 10,477,773 B1 * | 11/2019 | Hellbusch ............ A01D 75/002 |
| 2001/0026753 A1 * | 10/2001 | Bosich .................. B62D 53/062 |
| | | 414/482 |

FOREIGN PATENT DOCUMENTS

| EP | 2689957 | 1/2014 |
| EP | 3492315 | 6/2019 |
| WO | WO-2021014474 A1 * | 1/2021 .............. B60P 1/027 |

OTHER PUBLICATIONS

International Search Report and the Written Opinion dated Oct. 21, 2020 From the International Searching Authority Re. Application No. PCT/IT2020/050174. (8 Pages).
Rapporto di Ricerca e Opinione Scritta [Search Report and Written Opinion] dated Apr. 23, 2020 From the Ministero Dello Sviluppo Economico, Direzione Generale Sviluppo Produttivo e Competitivita, Ufficio Italiano Brevetti e Marchi Re. Application No. IT 201900012795. (9 Pages).

* cited by examiner

*Primary Examiner* — Kaitlin S Joerger

(57) ABSTRACT

A trailer with at least one tilting axle unit, comprising a telescopic support or slide (3), a hinge (221) and a fifth-wheel coupling (4), designed to longitudinally move at least one posterior axle unit and to lift and rotate it so that a vehicle can be loaded on a loading deck (13) of said trailer.

11 Claims, 5 Drawing Sheets

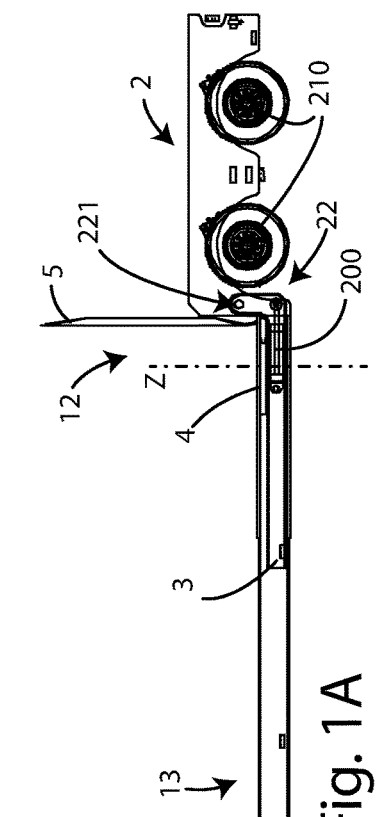
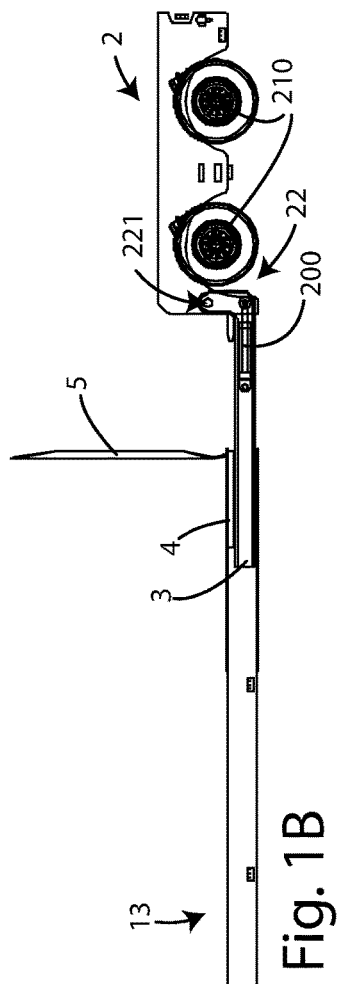
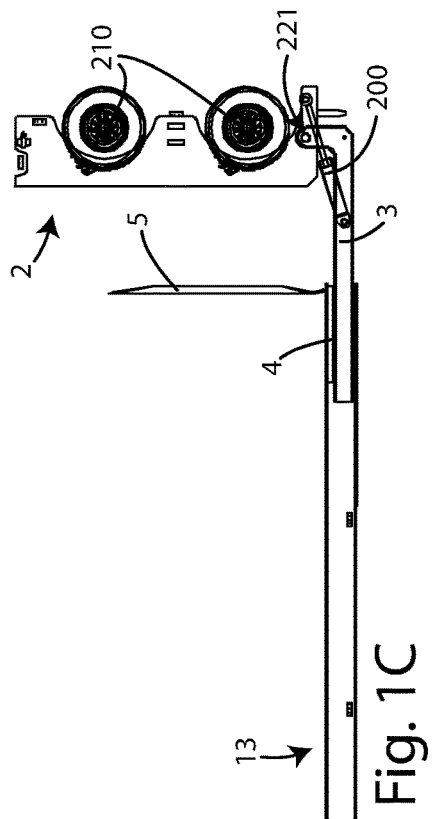
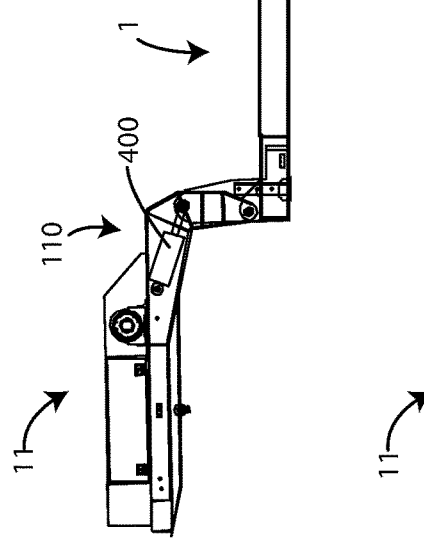
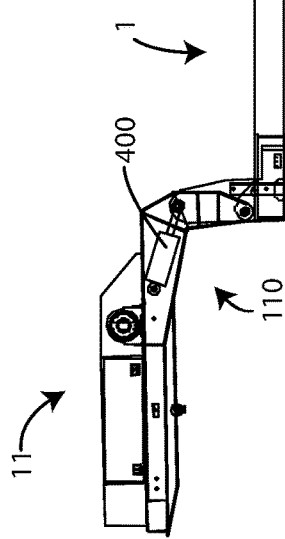
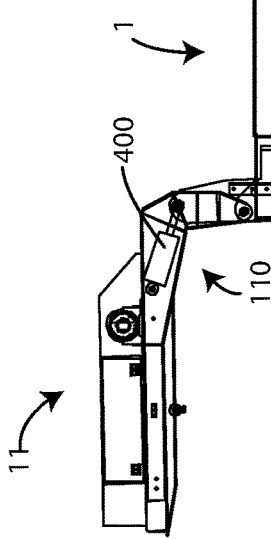
Fig. 1A  Fig. 1B  Fig. 1C

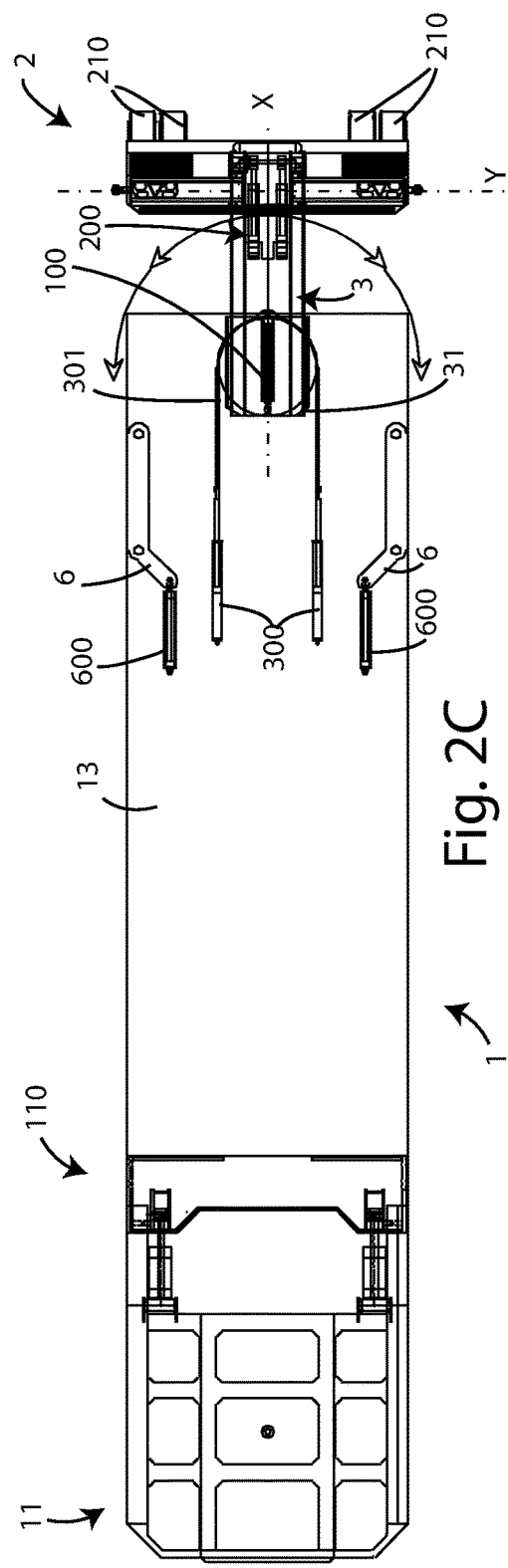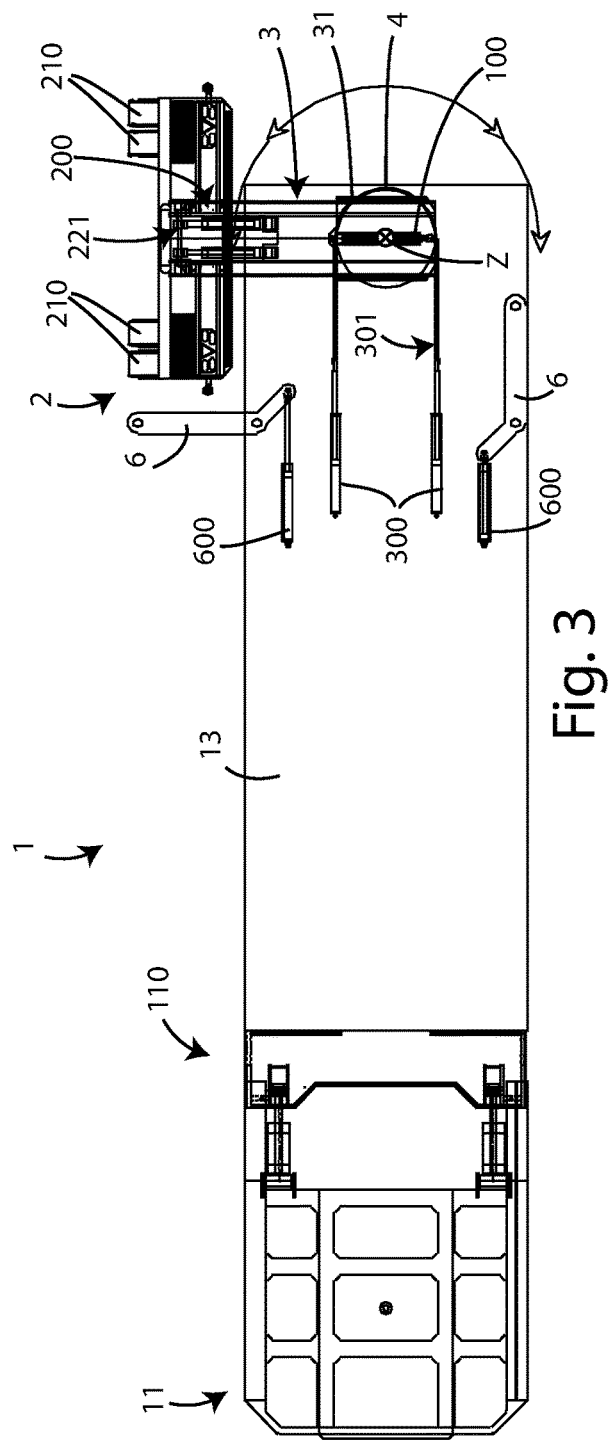

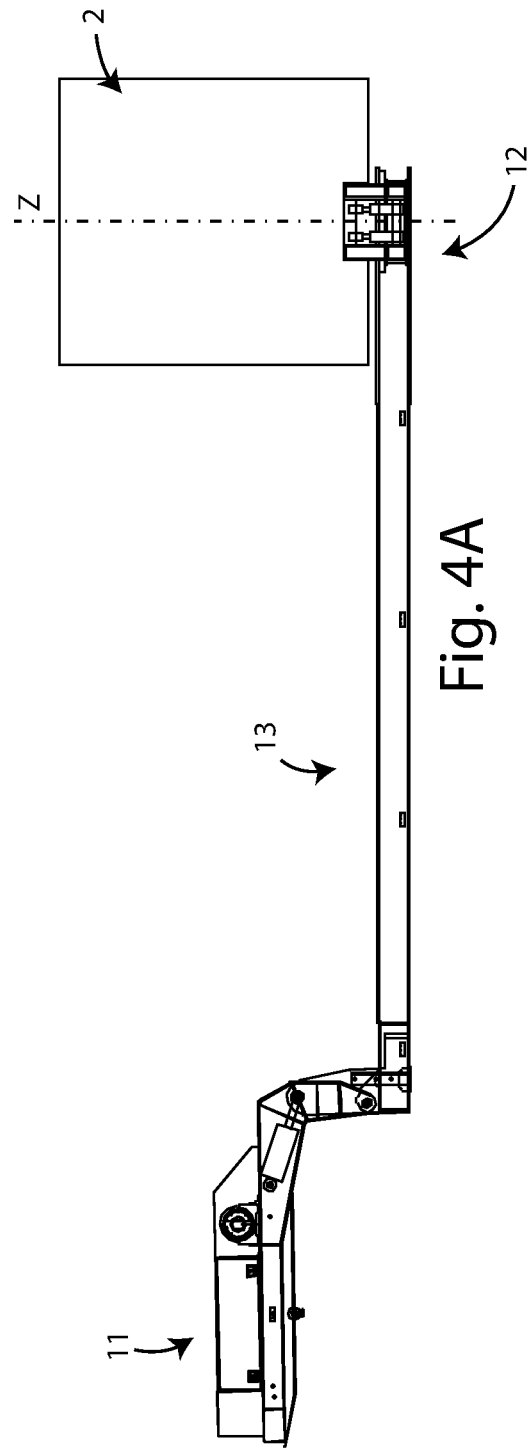
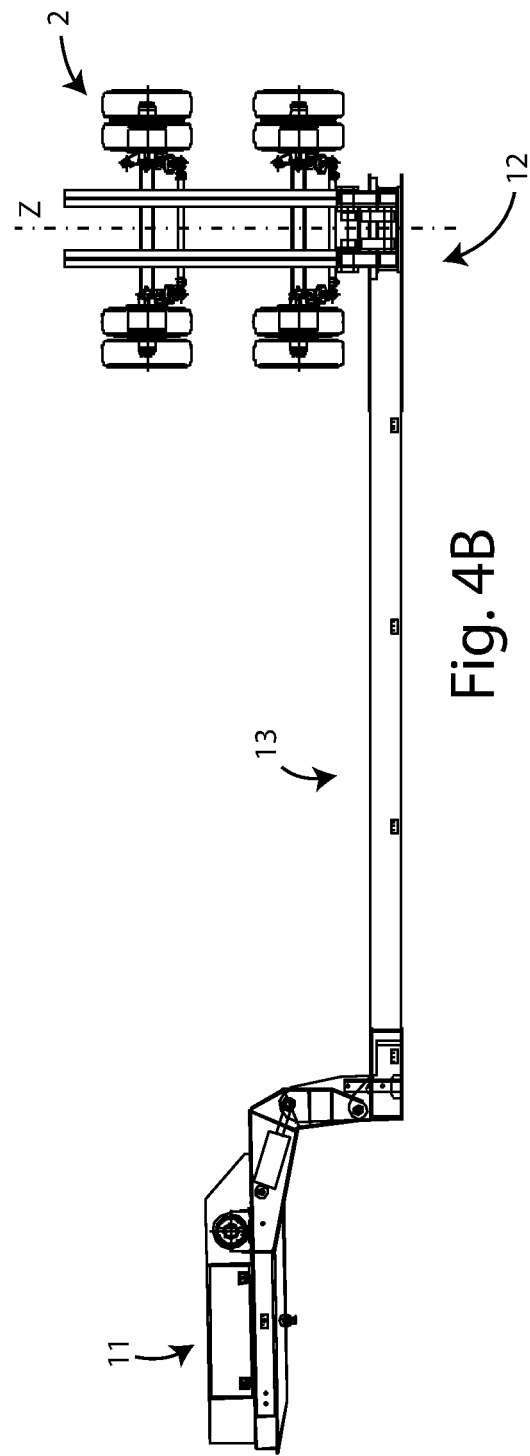

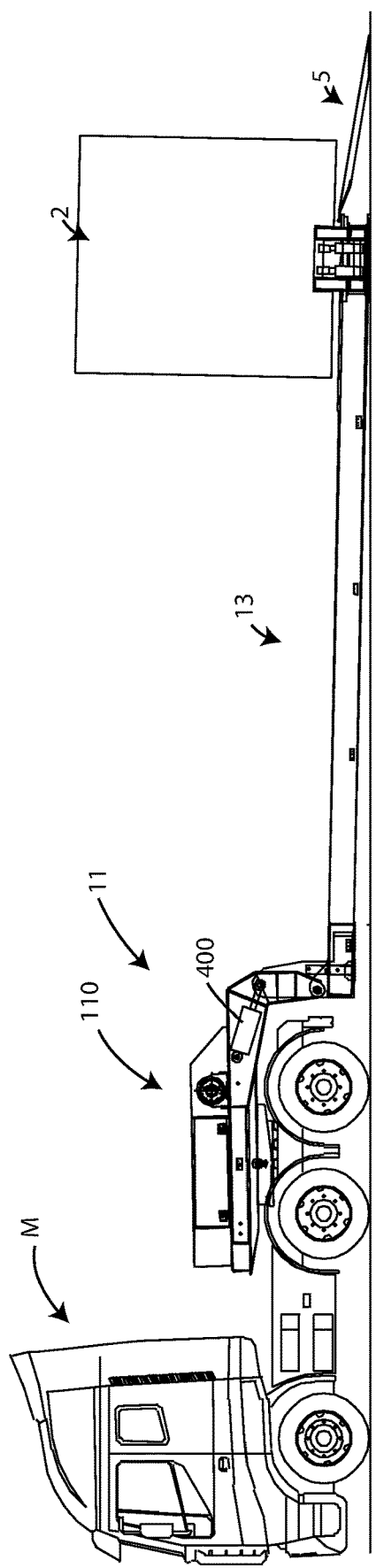
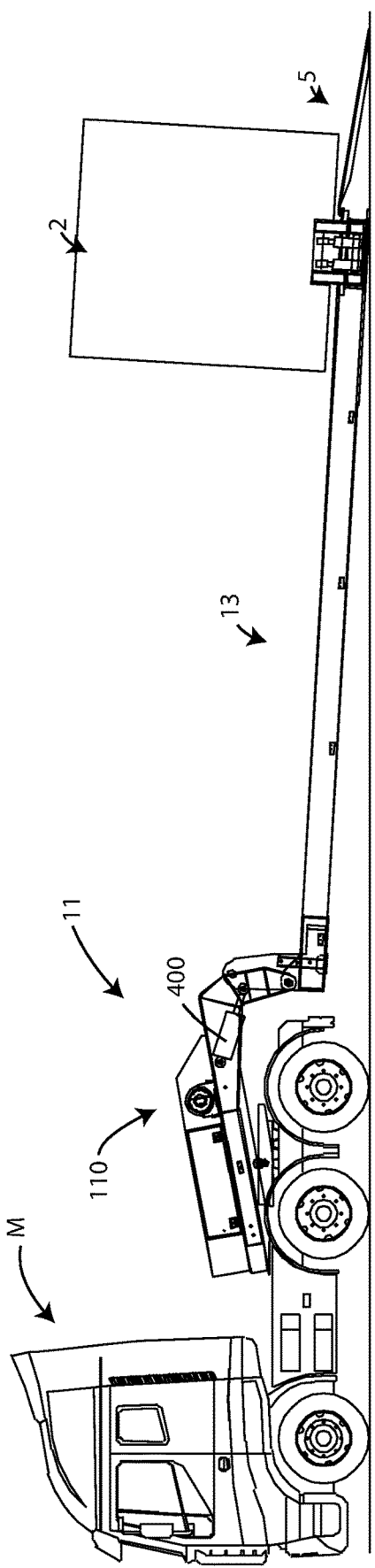

TRAILER WITH TILTING AXLE UNIT

RELATED APPLICATIONS

This application is a National Phase of PCT Patent Application No. PCT/IT2020/050174 having International filing date of Jul. 15, 2020, which claims the benefit of priority of Italian Patent Application No. 102019000012795 filed on Jul. 24, 2019. The contents of the above applications are all incorporated by reference as if fully set forth herein in their entirety.

FIELD AND BACKGROUND OF THE INVENTION

This invention relates to a trailer equipped with a tilting axle unit.

More in detail, the invention refers to a trailer suitable for the transport of vehicles of considerable dimensions and overall size; to allow this, the rear axles of the trailer according to the invention may be moved and moved away from the rear end of the trailer itself.

This makes it possible to load the vehicles to be transported without disconnecting the trailer from the tractor, eliminating the obstruction caused by the presence of the rear end wheel groups.

Trailers and semi-trailers known at present generally have a lowered central loading deck, supported at the rear by one or more wheel groups; in the anterior zone there is a coupling device for towing by a tractor, which also keeps the loading deck in a horizontal position and away from the ground.

Usually, in order to place the load on the loading deck, the trailer is detached from the tractor and the portion of coupling device is removed from the tractor; the front portion of the trailer is then lowered until it touches the ground, obtaining a ramp that the vehicle to be loaded can travel along in order to be arranged on the lowered zone of the loading deck.

Finally, after repositioning the hook for the tractor, the loading deck is raised again and recoupled.

It is clear that such a procedure has some disadvantages; first of all, it is impractical to perform as it requires a large number of steps to complete, thus increasing the complexity and duration of the operations.

In addition, it is necessary to have a large amount of space available, both for moving the removed parts and for manoeuvring vehicles, which is to take into consideration also the vehicles assisting in the manoeuvres, such as forklifts and the like.

Alternative solutions have been proposed in recent years (see for example US patent 2001/0026753), which provide the possibility of releasing and rotating the posterior half-axles of the trailer around an axle perpendicular to the ground, bringing them to a lateral position; in this way, it is possible to lower the loading deck at the posterior zone and load a vehicle without disconnecting the trailer from the tractor.

Even if it partially resolves the mentioned disadvantages, such an apparatus is however rather complicated to dismantle and reassemble, since the contribution of one or more operators remains fundamental to carry out the procedure; moreover, a solution of the type just described can be implemented only on trailers that have, in the posterior zone, no more than one or two axles, because the procedure for moving them would be too inconvenient and complicated to perform.

SUMMARY OF THE INVENTION

The aim of this invention therefore, is to make a trailer that is more practical and quicker to use and that can solve the disadvantages of the known technique described above.

In particular, one aim of the invention is to provide a trailer equipped with at least one tilting axle unit that allows loading vehicles having significant dimensions and overall size without requiring too much manoeuvring space.

Another aim of this invention is to make the preparation and execution of the procedure for loading a vehicle onto a trailer quicker and easier.

Another aim of the invention is to eliminate, or at least drastically reduce, the need for intervention by external operators in preparing and executing the procedure.

Another aim of this invention is to provide a trailer equipped with at least one tilting axle unit that is relatively easy and economical to manufacture. This and other aims are achieved by a trailer equipped with a tilting axle unit according to the attached claim 1; further detailed technical characteristics are given in the attached dependent claims.

BRIEF DESCRIPTION OF THE SEVERAL VIEWS OF THE DRAWINGS

This invention will now be described by way of non-limiting example according to some of its preferred embodiments, with the aid of the attached figures, wherein:

FIGS. 1A, 1B and 1C represent side views of the trailer equipped with at least one tilting axle unit according to the invention, when performing the tilting procedure;

FIGS. 2A, 2B and 2C represent top views of the trailer equipped with at least one tilting axle unit according to the invention, in the three configurations shown in FIGS. 1A, 1B and 1C;

FIG. 3 represents a top view of the trailer according to the invention, in the final stage of the tilting procedure, when it is ready to receive a vehicle to be loaded;

FIGS. 4A and 4B represent a detail of the trailer in two possible loading attitudes, which are equivalent to each other;

FIGS. 5A and 5B show the trailer according to the invention, coupled to a tractor and in vehicle loading attitude.

DESCRIPTION OF SPECIFIC EMBODIMENTS OF THE INVENTION

Figure 2A:
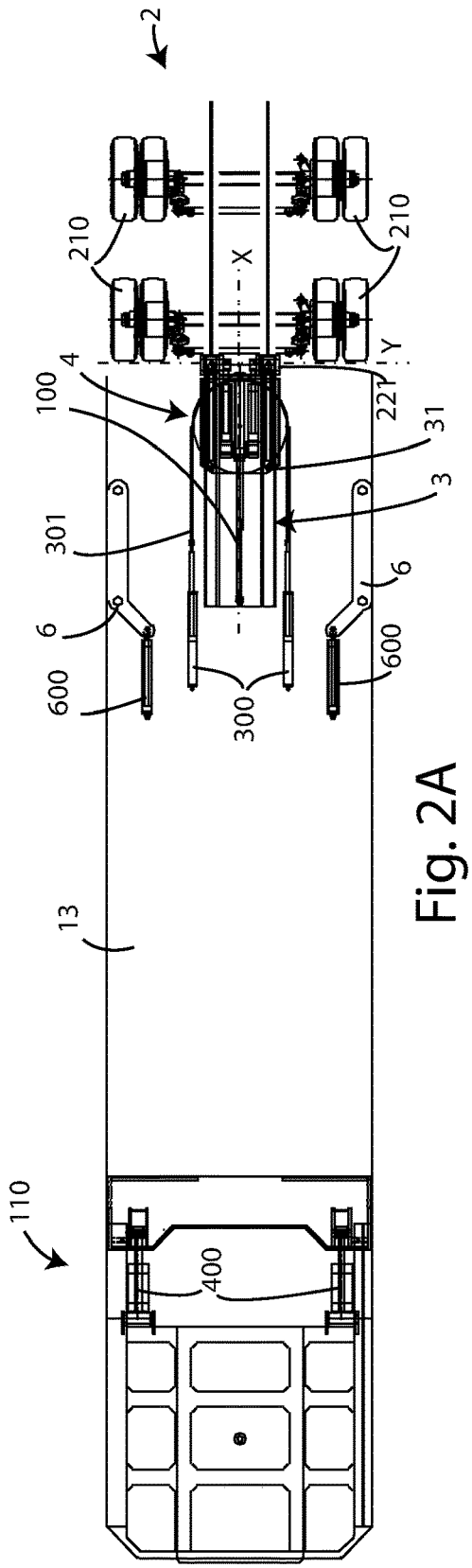
Figure 2B:
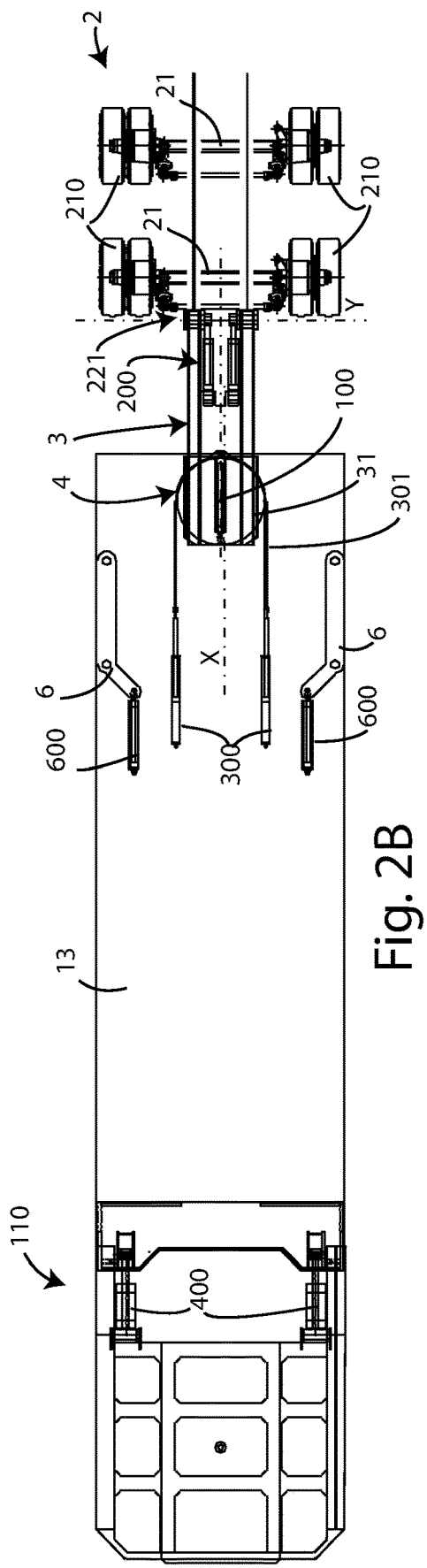

The embodiments shown in the attached figures comprise a semi-trailer 1, equipped with an anterior zone or front end 11, a posterior zone or rear end 12 zone and a central loading deck 13.

The front end 11 has a gooseneck coupling device 110 adapted to be coupled to a tractor (indicated by M in FIGS. 5A and 5B) for towing.

The loading deck 13 represented is of the lowered type, a prerogative already widely used in the transport of bulky loads, which allows gaining space in the vertical direction by lowering the supporting surface of the load to be transported and bringing it closer to the ground; however, given the presence of a peculiar system for lowering it to the ground implemented in the front end 11 of the semi-trailer 1 and described below, the invention may also be applied to trailers of conventional and non-lowered type.

In the posterior zone 12 there is a rear support 2 which includes one or more axles 21, each connected to one or more wheel groups 210.

The rear support 2 has a connection portion 22 to connect it to the semi-trailer 1 in a special way, by means of a telescopic support or slide 3.

More in detail, the telescopic support 3 my slide in one of its seats (fifth-wheel socket) 31 integrated in the loading deck 13, along an axis or direction X which is parallel to the ground and the longitudinal direction of extension of the semi-trailer 1; this movement is possible thanks to the use of first moving means 100, preferably pneumatic or hydraulic actuators.

Furthermore, the connection portion 22 is rotatably connected to the telescopic support 3 itself, e.g. by means of a hinge or pivot 221; this means that the rear support 2 can rotate around an axis Y which is parallel to the ground and perpendicular to the longitudinal direction of extension of the semi-trailer 1 thanks to the use of second moving means 200 consisting of, for example, actuators similar to the previous ones.

The telescopic support 3 is connected to a mobile fifth-wheel coupling 4 capable of rotating around a substantially vertical axis Z perpendicular to the ground and to the loading deck 13; to rotate the fifth-wheel coupling 4, it is possible to use third moving means 300, for example actuators assisted by belts or chains 301 and/or cogwheels.

Operationally, the procedure for preparing the trailer for loading a vehicle is carried out by the following steps.

The first step, with reference to FIGS. 1A, 1B and the corresponding plan views 2A and 2B, consists in moving the rear support 2 away from the loading deck 13 of the semi-trailer 1 by actuating first moving means 100, which translate the slide 3 along the axis X.

The second step, which is shown in FIGS. 1C and 2C and which takes place after or at the same time as when the rear part of the loading deck 13 touches the ground, involves lifting the rear support 2 by means of the second moving means 200; in this way, a rotation occurs around the axis Y which is involved by the connection portion 22 and which brings the rear support 2 to a substantially vertical position.

The third and last step, shown in FIGS. 3 and 4, is carried out by the third moving means 300, which cause the fifth-wheel coupling 4 to rotate around the axis Z by, for example, about 90°; the fifth-wheel coupling 4 itself drags the telescopic slide 3 laterally with it and, consequently, removes the rear support 2 from the access area for a vehicle to be loaded on the loading deck 13.

As mentioned, the moving means 300 of this last step may comprise, for example, belts and/or chains 301 connected to a friction surface and/or to a toothed surface obtained on or in any case integral with the fifth-wheel coupling 4, which allow it to rotate around the axis Z.

As shown in FIG. 4, the last step of the procedure advantageously is performed by turning the fifth-wheel coupling 4, alternately clockwise or counterclockwise, depending on the available manoeuvring space.

At the end of the preparation procedure, the rear end of the loading deck 13 of the semi-trailer 1 is in contact with the ground, so that it is easy to introduce a vehicle to be loaded; after the transit and positioning of the load, the semi-trailer 1 is returned to its original transport configuration by simply performing the steps described in reverse order.

It is also advantageous to include additional functionalities in the trailer according to the invention, adapted to facilitate and further optimize the procedure of loading a vehicle on the trailer itself; specifically, these functionalities include:

the use of an access ramp 5 to the loading deck positioned in the rear end 12 of the semi-trailer 1 (shown in FIGS. 1 and 5); this ramp 5 is lowered after the rotation of fifth-wheel coupling 4 to allow a smoother transit of the vehicle to be loaded;

the use of a tilt adjustment system comprising additional moving means 400, positioned at the front end 11 and adapted to modify the tilt of the loading deck 13 to further improve the angle of access to a vehicle approaching the trailer to occupy it; more specifically, as shown in FIGS. 5A and 5B, this adjustment system enables the section of the front end 11, comprising the gooseneck coupling device 110, to increase its distance from the ground and, consequently, the opposite end of the trailer, i.e. the rear end 12, is lowered towards the ground, facilitating the passage of the vehicle to be loaded;

the use of stabilizers 6, having the function of containing the rear support 2 once it is lifted and moved sideways and of protecting against any undesired movements of the rear support 2 itself; as shown in FIGS. 2A, 2B, 2C and 3, these stabilizers 6 are normally integrated in the loading deck 13 and when they are actuated by moving means 600, for example actuators or similar, they extend in a lateral direction, creating protective barriers against impacts or accidental movements of the support 2.

This description shows, therefore, how the tilting procedure involving the trailer according to the invention is feasible even without the supervision of a large number of operators, through the use of automatic moving means and with a limited and repeatable number of separate operations.

The space required to carry out the procedure is, moreover, rather limited by virtue of the fact that the rear support is repositioned laterally to the loading deck and along only one of its two sides.

The use, to manufacture the trailer, of mechanical parts and parts which are readily available and used in various sectors, such as actuators, slides, fifth-wheel couplings and chains, gives greater value to the invention, which is therefore, simple and economical to manufacture and repair.

Finally, it is also possible to use more than two axles of the rear support 2 attached to the chassis and, additionally, when the entire rear support 2 is rotated, it is also raised off the ground and therefore the trailer can be driven in reverse without using the tractor.

The features of the trailer equipped with a tilting axle unit the object of the invention clearly emerge from the preceding description, as do the advantages thereof.

It is also apparent that the invention is described by way of example only, without limiting the scope of application, according to its preferred embodiments, but it shall be understood that the invention may be modified and/or adapted by an expert in the field without thereby departing from the scope of the inventive concept of the claims herein.

The invention claimed is:

1. Trailer with at least a tilting axle unit comprising an anterior zone or front end (11) equipped with a coupling device (110) joinable to a tractor (M), an intermediate loading deck (13), a posterior zone or rear end (12) adjacent to a rear support (2), said rear support (2) comprising one or more axles (21) each connected to one or more wheel groups (210) to sustain said trailer while in a run configuration, characterized in comprising a telescopic support or slide (3) and a fifth-wheel coupling (4), connected each other by means of a socket or fifth-wheel socket (31), said telescopic support or slide (3) being connected to said rear support (2) and movable so that it slides in said socket (31) by means of first moving means (100) along a first axis (X) substantially parallel to the direction of the longitudinal extension of said trailer, said rear support (2) being rotatable and connected to said telescopic support or slide (3) by means of a hinge or pivot (221) that can be rotated around a second axis (Y) substantially parallel to the ground and perpendicular to said first axis (X), and being movable by means of second moving means (200) around said hinge or pivot (221), said fifth-wheel coupling (4) being placed in correspondence of said loading deck (13) and being rotatable, by means of third moving means (300), around a third axis (Z), substantially perpendicular to the ground and to said first axis (X) and to said second axis (Y), so that it rotationally drags said telescopic support or slide (3) and said rear support (2), to allow the loading of a vehicle on said loading deck (13) in correspondence of said posterior zone or rear end (12).

2. Trailer according to claim 1, characterized in that said third moving means (300) comprise belts and/or chains (301) and/or cogwheels or friction wheels.

3. Trailer according to claim 1, characterized in comprising fourth moving means (400) placed in said front end (11) of said trailer, and suitable to bring said front end (11) in a position distanced from the ground with respect to the run configuration and to bring said rear end (11) closer to the ground to reach a loading configuration.

4. Trailer according to claim 1, characterized in comprising stabilizers (6) suitable to prevent undesired movements of said rear support (2) when it is in a tilted position, said stabilizers (6) being able to reversibly switch, by means of fifth moving means (600), from a run position, wherein they are housed in said loading deck (13), to a loading position, wherein they extend towards a direction perpendicular to the longitudinal direction of the trailer.

5. Trailer according to claim 1, characterized in comprising a tilting ramp (5) connected to said rear end (12).

6. Trailer according to claim 2, characterized in comprising fourth moving means (400) placed in said front end (11) of said trailer, and suitable to bring said front end (11) in a position distanced from the ground with respect to the run configuration and to bring said rear end (11) closer to the ground to reach a loading configuration.

7. Trailer according to claim 2, characterized in comprising stabilizers (6) suitable to prevent undesired movements of said rear support (2) when it is in a tilted position, said stabilizers (6) being able to reversibly switch, by means of fifth moving means (600), from a run position, wherein they are housed in said loading deck (13), to a loading position, wherein they extend towards a direction perpendicular to the longitudinal direction of the trailer.

8. Trailer according to claim 3, characterized in comprising stabilizers (6) suitable to prevent undesired movements of said rear support (2) when it is in a tilted position, said stabilizers (6) being able to reversibly switch, by means of fifth moving means (600), from a run position, wherein they are housed in said loading deck (13), to a loading position, wherein they extend towards a direction perpendicular to the longitudinal direction of the trailer.

9. Trailer according to claim 2, characterized in comprising a tilting ramp (5) connected to said rear end (12).

10. Trailer according to claim 3, characterized in comprising a tilting ramp (5) connected to said rear end (12).

11. Trailer according to claim 4, characterized in comprising a tilting ramp (5) connected to said rear end (12).

* * * * *